(12) United States Patent
Moore

(10) Patent No.: US 9,579,836 B2
(45) Date of Patent: Feb. 28, 2017

(54) COLLAPSIBLE CORE ASSEMBLIES FOR INJECTION MOLDING DEVICES

(71) Applicant: Amcor Rigid Plastics USA, LLC, Manchester, MI (US)

(72) Inventor: Garry R. Moore, New Lebanon, OH (US)

(73) Assignee: Amcor Rigid Plastics USA, LLC, Ann Arbor, MI (US)

( * ) Notice: Subject to any disclaimer, the term of this patent is extended or adjusted under 35 U.S.C. 154(b) by 0 days.

(21) Appl. No.: 14/264,713

(22) Filed: Apr. 29, 2014

(65) Prior Publication Data

US 2014/0319731 A1    Oct. 30, 2014

Related U.S. Application Data

(60) Provisional application No. 61/817,108, filed on Apr. 29, 2013, provisional application No. 61/955,507, filed on Mar. 19, 2014.

(51) Int. Cl.
*B29C 45/44* (2006.01)
*B29C 45/26* (2006.01)
*B29K 105/00* (2006.01)

(52) U.S. Cl.
CPC ...... *B29C 45/4421* (2013.01); *B29C 45/2612* (2013.01); *B29K 2105/258* (2013.01)

(58) Field of Classification Search
CPC ................... B29C 2045/4428; B29C 45/4421
See application file for complete search history.

(56) References Cited

U.S. PATENT DOCUMENTS

| 4,130,264 | A | * | 12/1978 | Schroer | B29C 45/4421 164/345 |
| 4,533,312 | A | * | 8/1985 | Von Holdt | B29C 45/4421 249/142 |
| 4,938,679 | A | * | 7/1990 | Pietrorazio | B29C 45/4421 249/180 |
| 5,217,731 | A | * | 6/1993 | Fallent | B29C 45/4421 249/178 |
| 6,068,811 | A |   | 5/2000 | Koda | |
| 8,002,538 | B2 |   | 8/2011 | Zydron | |
| 2002/0001637 | A1 | * | 1/2002 | Taha | B29C 45/262 425/438 |
| 2009/0152770 | A1 |   | 6/2009 | Mikac et al. | |

* cited by examiner

*Primary Examiner* — Jill Heitbrink
(74) *Attorney, Agent, or Firm* — Ulmer & Berne LLP

(57) ABSTRACT

An injection molding assembly comprising a collapsible core assembly, an injection mold press comprising an internal cavity configured to receive the collapsible core assembly, and an actuator configured to insert the collapsible core assembly into the internal cavity of the mold press and method of using the same. The collapsible core assembly may comprise a static core member, a moveable core member coaxial to the static core member and moveable relative to the static core member, and a stripper plate moveable within the collapsible core assembly relative to the static core and configured to eject the molded part. The moveable core member may comprise an external engagement feature disposed at an end of the moveable core member. The external engagement feature may define a geometry operable to matingly engage an internal feature of a molded part supported on the moveable core member upon formation of the molded part.

7 Claims, 21 Drawing Sheets

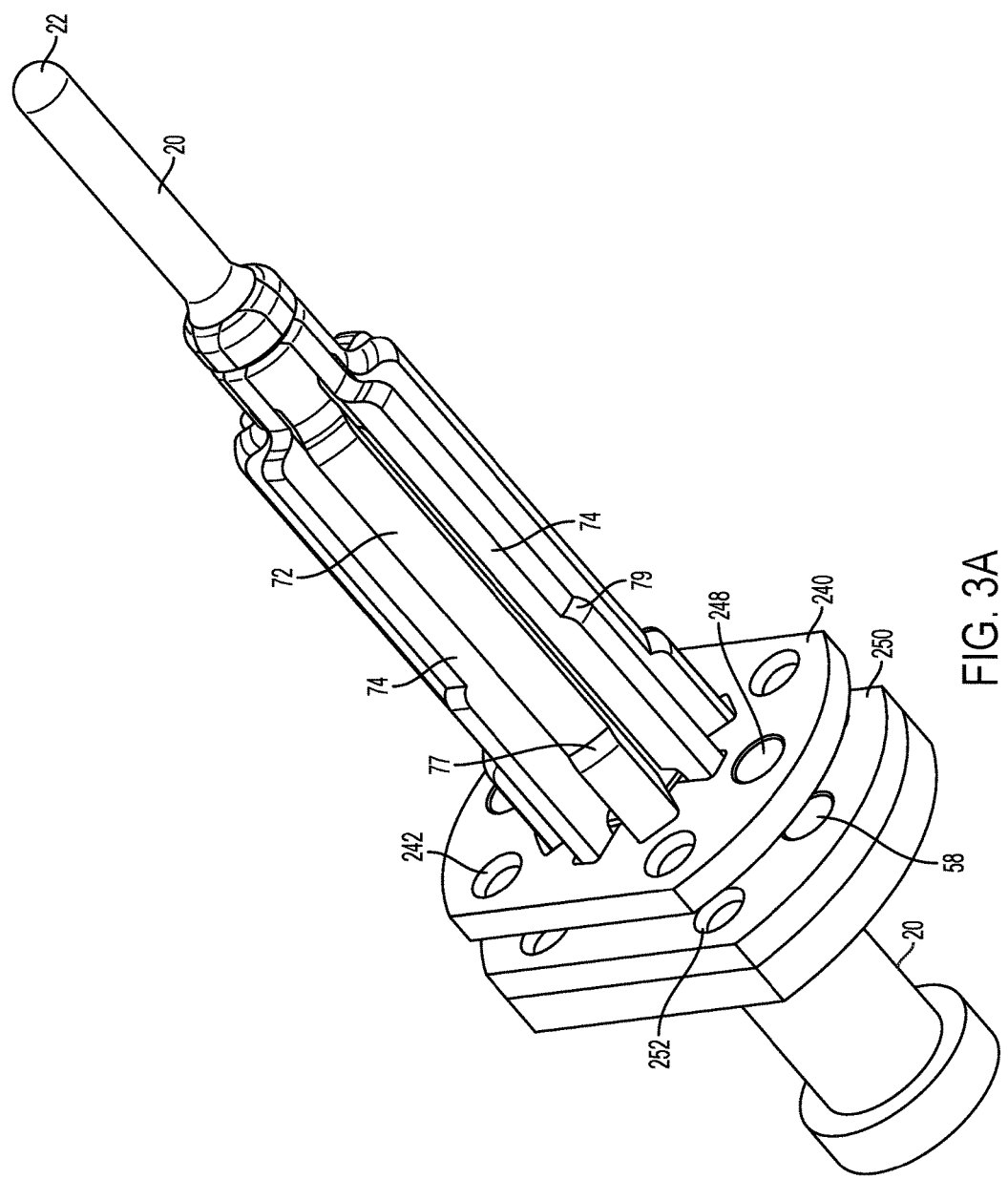

COLLAPSIBLE CORE ASSEMBLIES FOR INJECTION MOLDING DEVICES

CROSS REFERENCE TO RELATED APPLICATIONS

This application claims the benefit of U.S. Provisional Application Ser. No. 61/817,108, filed Apr. 29, 2013. This application further claims the benefit of U.S. Provisional Application Ser. No. 61/955,507, filed Mar. 19, 2014.

TECHNICAL FIELD

The present disclosure generally relates to apparatus and methods for injection molding devices and systems, and more particularly, is directed to collapsible core assemblies for molding internal features in a molded part.

BRIEF SUMMARY

An injection molding assembly may comprise a collapsible core assembly, an injection mold press comprising an internal cavity configured to receive the collapsible core assembly, and an actuator configured to insert the collapsible core assembly into the internal cavity of the mold press. The collapsible core assembly may comprise a static core member, a moveable core member coaxial to the static core member and moveable relative to the static core member, and a stripper plate moveable within the collapsible core assembly relative to the static core and configured to eject the molded part with the external engagement feature. The moveable core member may comprise an external engagement feature disposed at an end of the moveable core member. The external engagement feature may define a geometry operable to matingly engage an internal feature of a molded part which may be supported on the moveable core member upon formation of the molded part. The molded part with an internal feature may be operable to be produced in the spacing between the collapsible core assembly and the internal cavity.

A method of creating a molded part with internal feature may comprise a first step of providing an injection mold system comprising a collapsible core assembly, an injection mold press comprising an internal cavity, and an actuator. The collapsible core assembly may comprise a static core member, a moveable core member coaxial to the static core member and moveable relative to the static core member, the moveable core member comprising an external engagement feature at one end, and a stripper plate; a second step of inserting the collapsible core assembly into the internal cavity of the injection mold press to form a closed mold; a third step of injecting resin in the spacing between the collapsible core assembly and the internal cavity to form the molded part, wherein the internal feature of the molded part is formed over the external engagement feature of the moveable core assembly and mating engages the external engagement feature; a fourth step of disengaging the movable core member from mated engagement with the molded part; and fifth step of ejecting the disengaged molded part with the stripper plate.

BRIEF DESCRIPTION OF THE DRAWINGS

The following detailed description of illustrative embodiments of the present disclosure can be best understood when read in conjunction with the following drawings, where like structure is indicated with like reference numerals and in which:

FIG. 3A is top perspective view of the collapsible core assembly according to one or more embodiments shown and described herein;

DETAILED DESCRIPTION

Referring to FIGS. 1A, 1B, and 9-12, an injection molding assembly 1 may comprise a collapsible core assembly 2, an injection mold press 10 comprising an internal cavity 12 configured to receive the collapsible core assembly 2, and an actuator (not shown) configured to insert the collapsible core assembly 2 into the internal cavity 12 of the mold press 10.

Figure 1A:
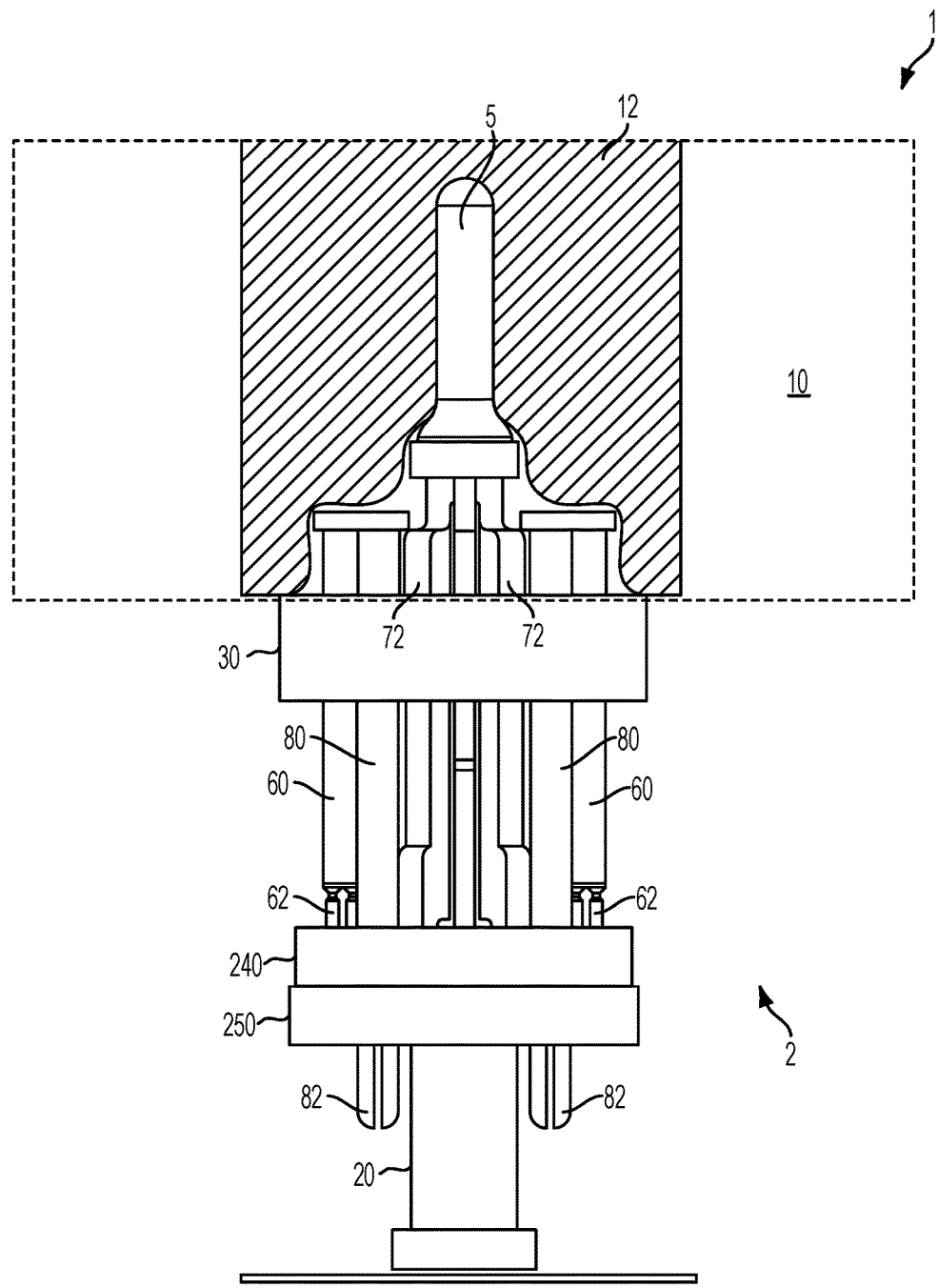
FIG. 1A is a schematic view from a side elevation of the injection molding assembly in a closed configuration according to one or more embodiments shown and described herein.

The actuator (not shown) may comprise ejectors such as, for example, conventional ejectors used in conventional injection molding processes. As shown in FIG. 1A, embodiments of the injection mold press 10 may include ejectors (not shown) that move actuator pins 60 and 80 of the collapsible core assembly 2, thereby moving the other moveable components of the collapsible core assembly 2 as described below. In other embodiments, the injection molding assembly 1 may comprise ejectors that move the knock out rods 160 of the collapsible core assembly 2, likewise moving some of the other moveable components of the collapsible core assembly 2 as described below.

Figure 2:
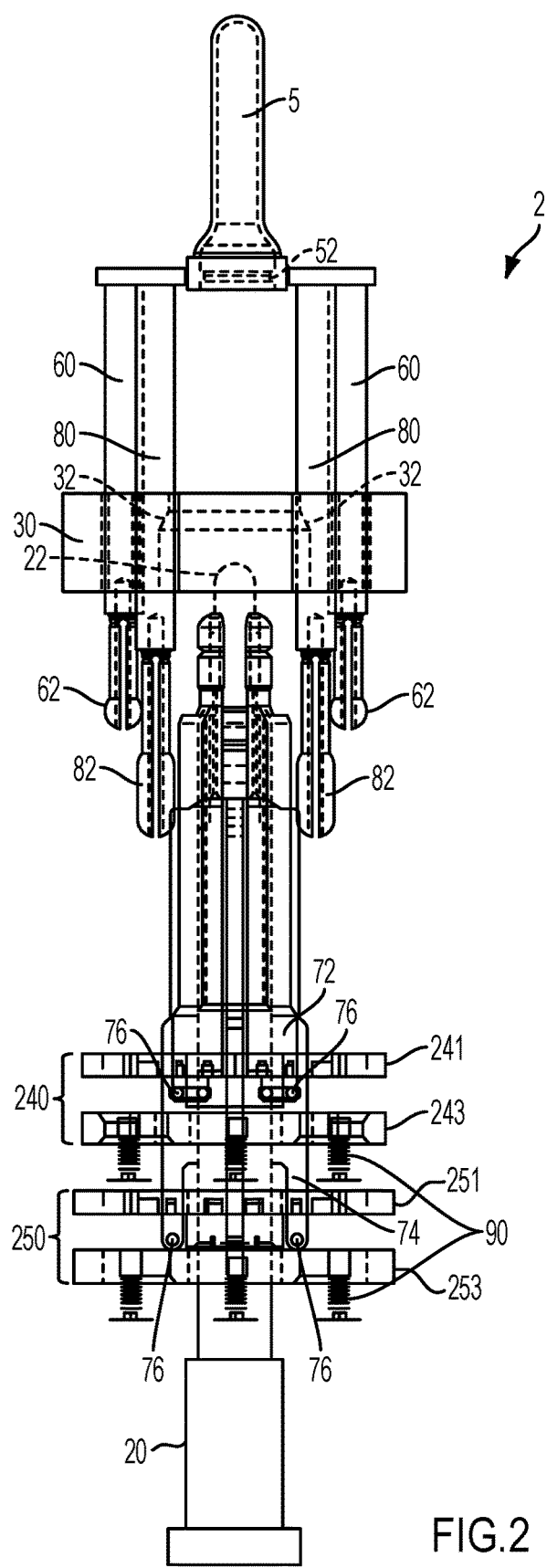
FIG. 2 is a schematic view from a side elevation of a collapsible core assembly according to one or more embodiments shown and described herein.

Referring to FIG. 2, an embodiment of the collapsible core assembly 2 may comprise a static core member 20, a moveable core member coaxial to the static core member 20 and moveable relative to the static core member 20, and a stripper plate 100 moveable within the collapsible core assembly 2 relative to the static core 20 and configured to eject a molded part 5. The molded part 5 may comprise an internal feature 52 and be operable to be produced in the spacing between the collapsible core assembly 2 and the internal cavity 12. The moveable core member may comprise an external engagement feature disposed at an end of the moveable core member. The external engagement feature may define a geometry operable to matingly engage the internal feature 52 of the molded part which may be supported on the moveable core member upon formation of the molded part 5. In one or more embodiments shown and described herein the internal feature 52 may be disposed within an interior surface 51 of the molded part 5 such as, for example, internal threads disposed on an inner surface 51 of a cavity disposed within an interior of the molded part 5. Similarly, in one or more embodiments shown and described herein, the external engagement feature of the movable core member may comprise, for example, threading disposed on an external surface that is configured to matingly engage the internal feature 52 of the molded part 5 upon formation of the molded part via the molding process 500.

The static core member 20 may comprise a cylindrical rod. Referring to FIGS. 1A, 2, 6A, 9-13, and 15, the core member 20 may have a rounded end 22 at one end of the core member 20. Other shapes for the rounded end 22 are contemplated herein. The core member 20 is static in this collapsible core assembly 2. As seen in FIGS. 9-13 and 15, some embodiments may have the core member 20 held stationary by a stationary core retainer 23. The stationary core retainer 23 may be imbedded or incorporated in a second retainer plate 142.

Figure 6A:
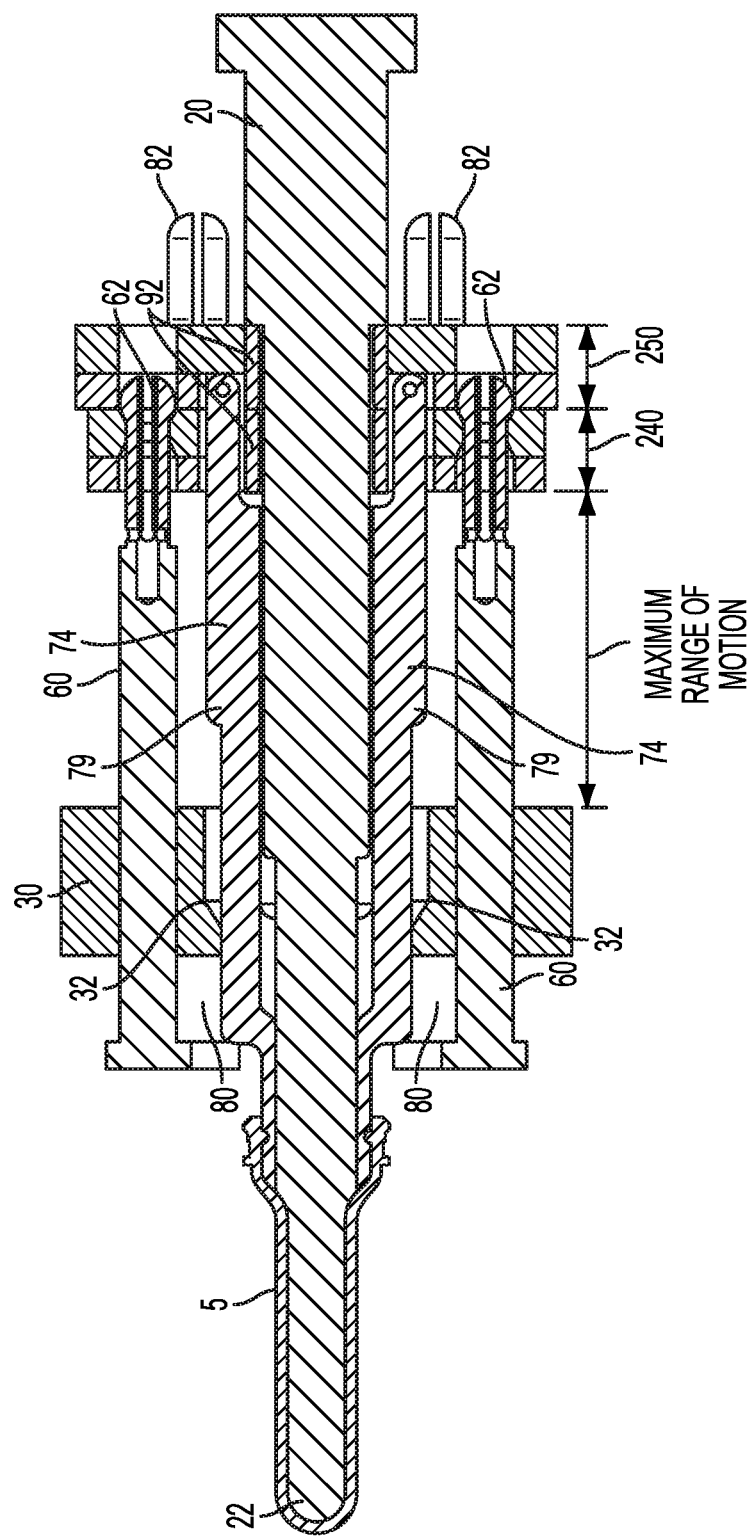
FIG. 6A is a schematic view from a side elevation of the collapsible core assembly in a closed configuration according to one or more embodiments shown and described herein.

As shown in FIGS. 2 and 6A, additionally or alternatively, the collapsible core assembly 2 may include a static control ring 30 at the upper end of the collapsible core assembly 2. Like the core member 20, the static control ring 30 does not move. Additionally or alternatively, the static control ring 30 may include a recessed portion 32.

Figure 3B:
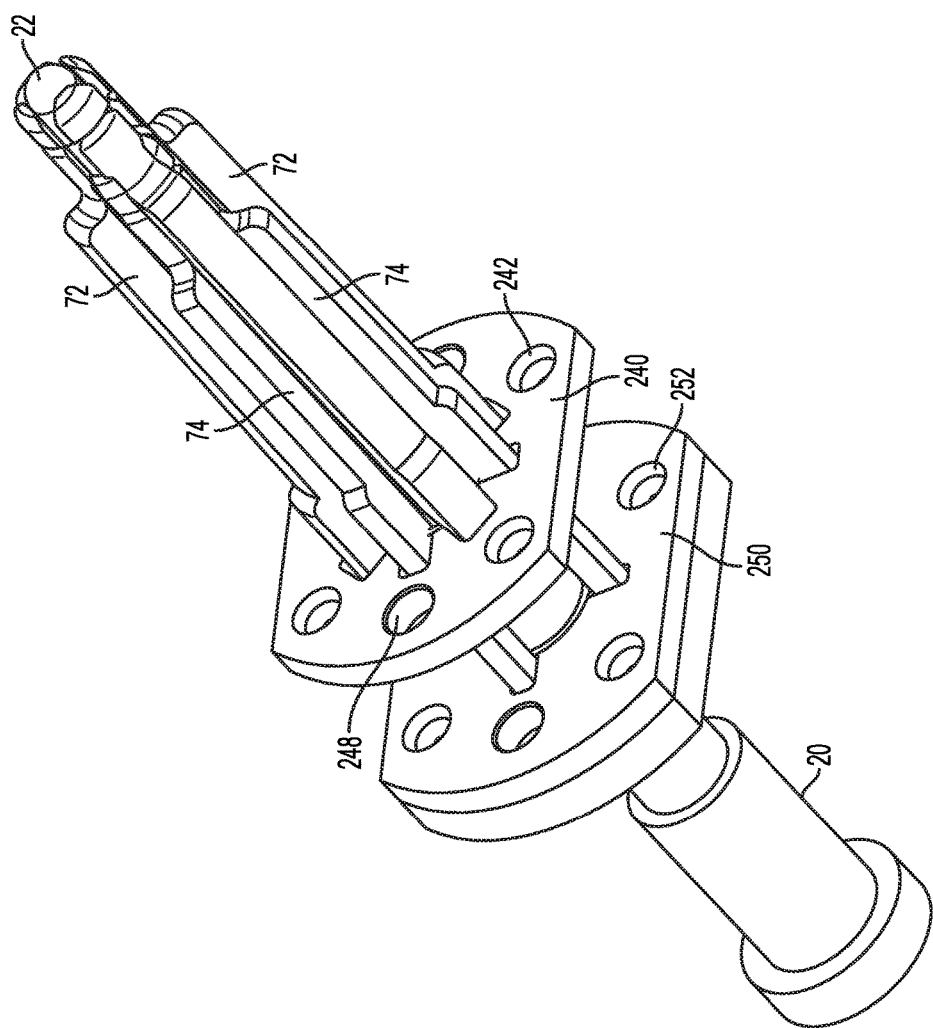
FIG. 3B is top perspective view of the collapsible core assembly according to one or more embodiments shown and described herein.

The movable core member may define a ring shape coaxial to the static core member 20. Referring to FIGS. 2 and 3A, some embodiments of the moveable core member may comprise a plurality of extendable members 72, 74. The extendable members 72 and 74 may be operable to engage the internal feature 52 of a molded part 5 when formed. In one specific embodiment, eight (8) collapsible fingers 72, 74 are utilized in this coaxial arrangement; however, any number or combination of additional fingers is contemplated herein. The collapsible finger 72 and 74, when not being compressed or collapsed, may coaxially surround the core member 20; however, the core member 20 may not contact the collapsible fingers 72 and 74 when not compressed or collapsed. Additionally as will be described in detail below, the collapsible fingers 72 and 74 are structurally different from each other, such that these collapsible fingers 72 and 74 may detach from the internal feature 52 of the mold part 5 at different times.

As used herein, collapsible finger 74 will be called the shorter movement collapsible finger 74, whereas collapsible finger 72 will be referred to as the longer movement collapsible finger 72. As defined herein, "shorter movement collapsible finger" means that the shorter movement collapsible finger 74 will travel a lesser distance about the core member 20, whereas "longer movement collapsible finger" means that the longer movement collapsible finger 72 will travel a greater distance about the core member 20. Various structures are contemplated for the collapsible fingers 72 and 74 so long as they may detach from the internal feature 52 independently.

Referring to FIG. 2, the shorter movement collapsible finger 74 may be attached to and moveable with the lower retaining plate 250 and the longer movement collapsible finger 72 may be attached to and moveable with the upper retaining plate 240. Various mechanisms are contemplated for attaching the longer movement collapsible finger 72 and the shorter movement collapsible finger 74 to the upper retaining plate 240 and lower retaining plate, respectively. In some embodiments, hinge pins 76 may be used, because pivoting of the collapsible fingers 72, 74 may be desirable.

Figure 8A:
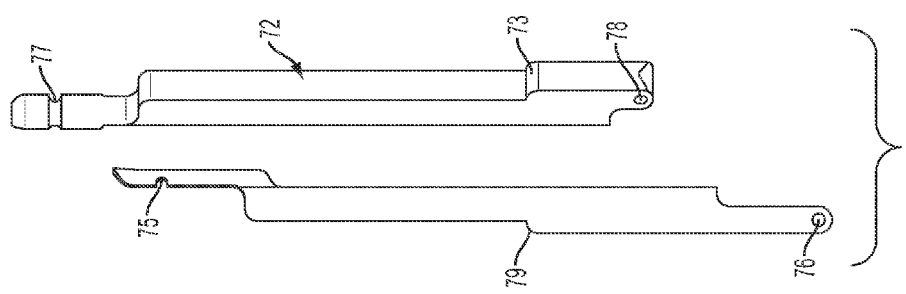
FIG. 8A is a side view of two extendable members according to one or more embodiments shown and described herein.

In specific embodiments as shown in FIGS. 6A and 8A, the shorter movement collapsible finger 74 may include a lip portion 79, which may be configured to engage the recessed portion 32 of the static control ring 30, thereby detaching the undercut engagement portion 75 from the internal feature 52 of the molded part 5. In some embodiments, the undercut engagement portion 75 may couple via an interference fit with the internal feature 52 of the mold part 5. Similarly, the longer movement collapsible finger 72 may include a lip portion 73, which may also be configured to engage the recessed portion 32 of the static control ring 30, thereby decoupling the interference fit between the undercut engagement portion 77 and the internal feature 52 of the molded part 5.

Referring again to FIGS. 1A, 1B, and 2, the collapsible core assembly 2 may include actuation pins 60, 80, which may be engaged and moved by ejectors (not shown) of the mold press 10. As described below, moving these actuation pins 60 and 80 creates movement in the upper retaining plate 240 and/or lower retaining plate 250.

Figure 4A:
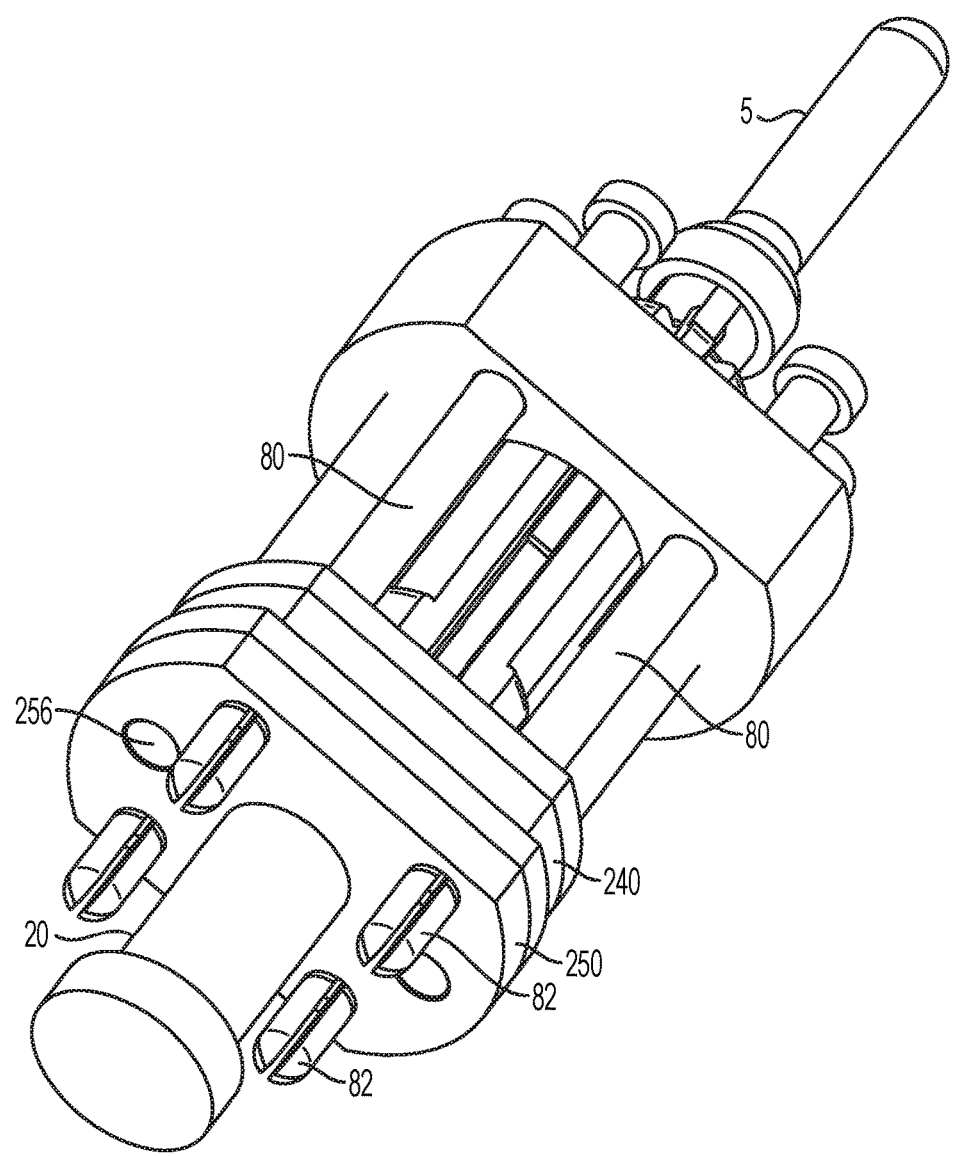
FIG. 4A is back left perspective view of the collapsible core assembly according to one or more embodiments shown and described herein.
Figure 4B:
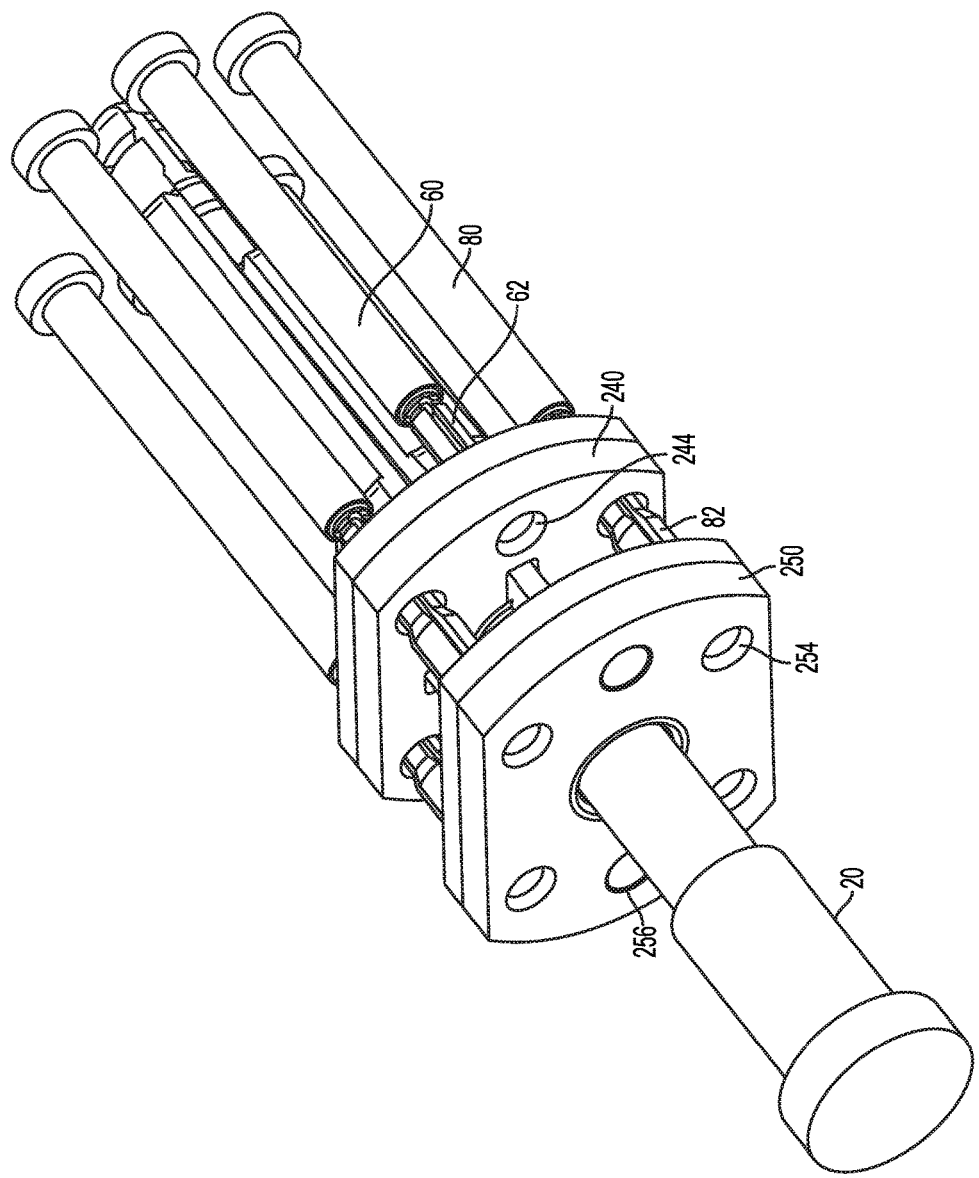
FIG. 4B is back right perspective view of the collapsible core assembly of FIG. 4A.
Figure 5A:
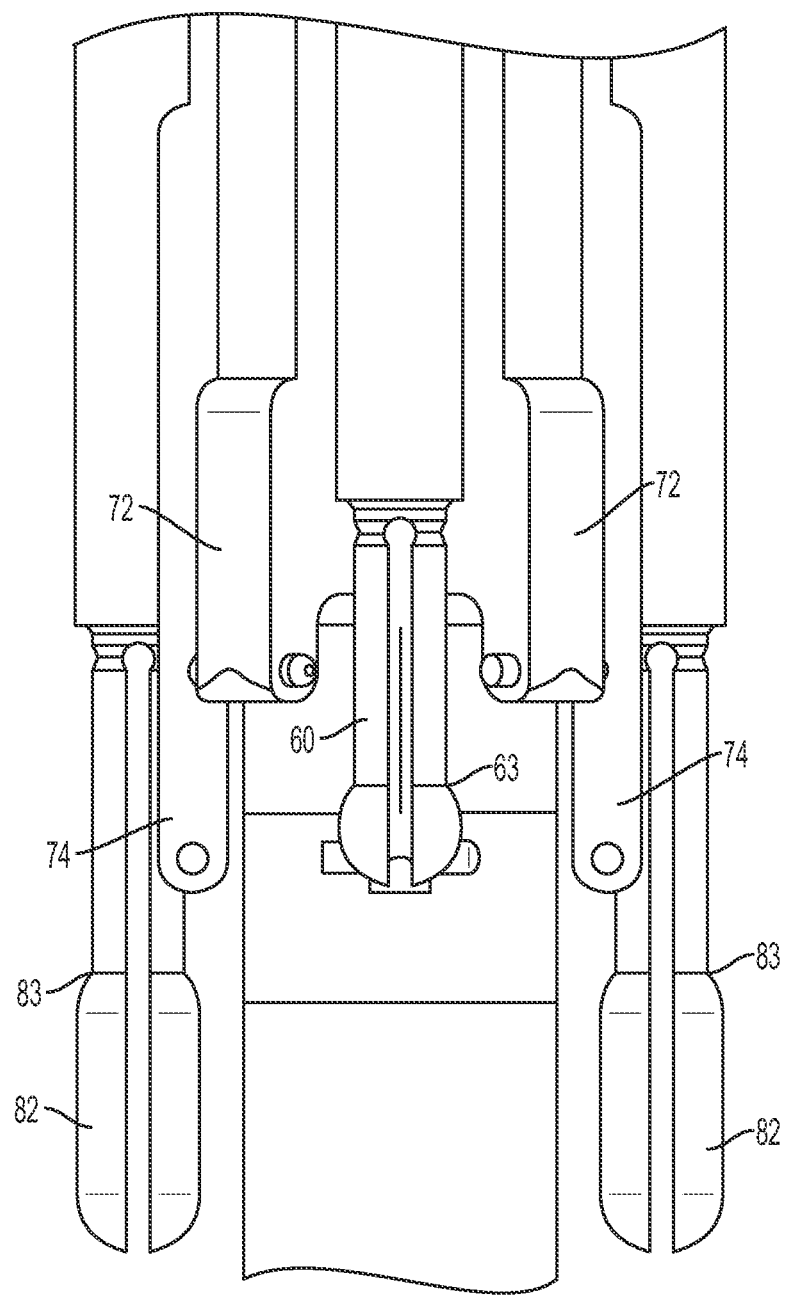
FIG. 5A is a side elevation view of the collapsible core assembly according to one or more embodiments shown and described herein.
Figure 5B:
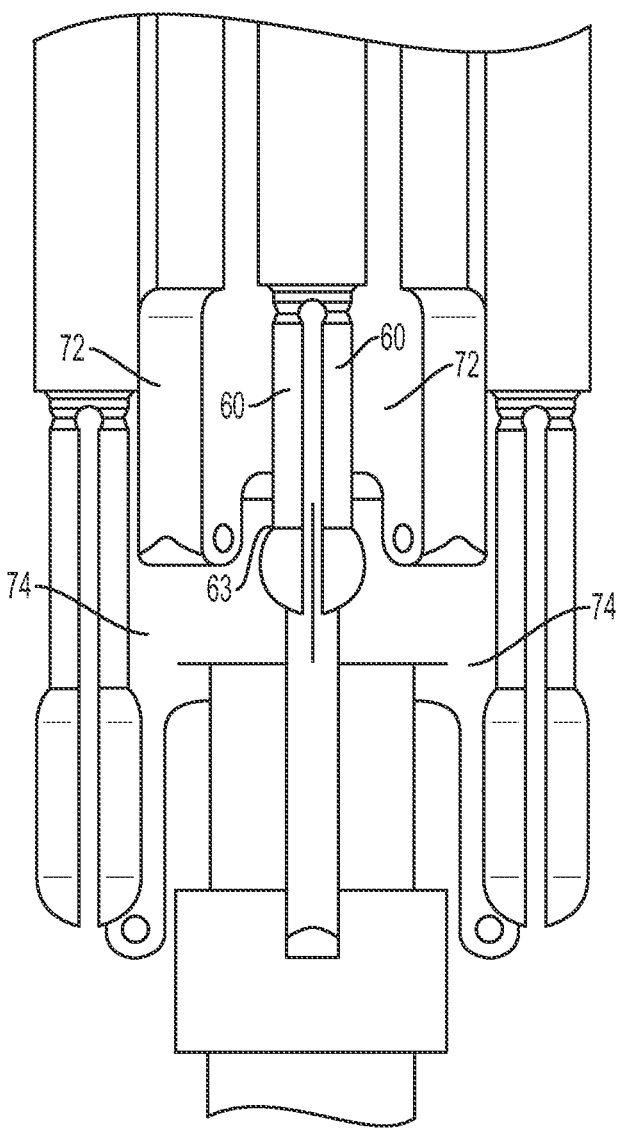
FIG. 5B is side elevation view of the collapsible core assembly of FIG. 5A.
Figure 6B:
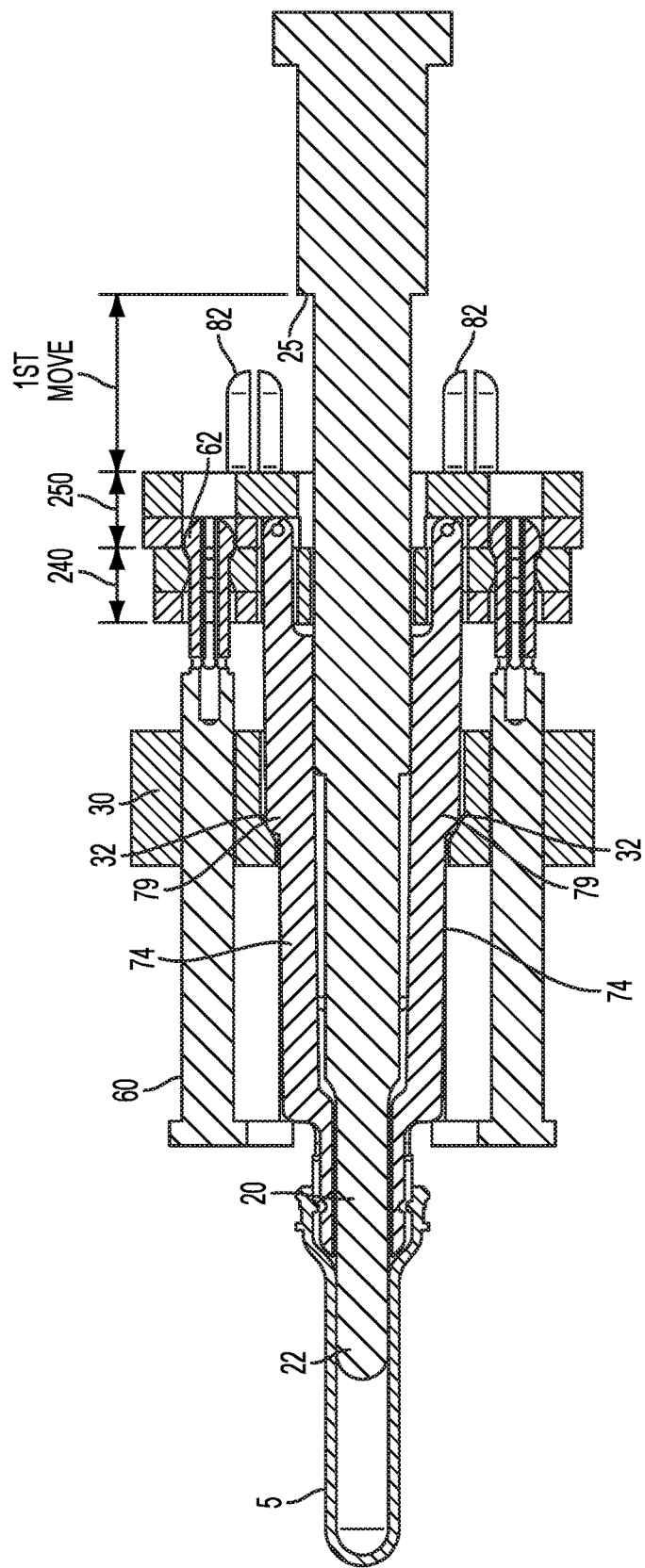
FIG. 6B is a schematic view from a side elevation of the collapsible core assembly in a unthreading configuration according to one or more embodiments shown and described herein.
Figure 7:
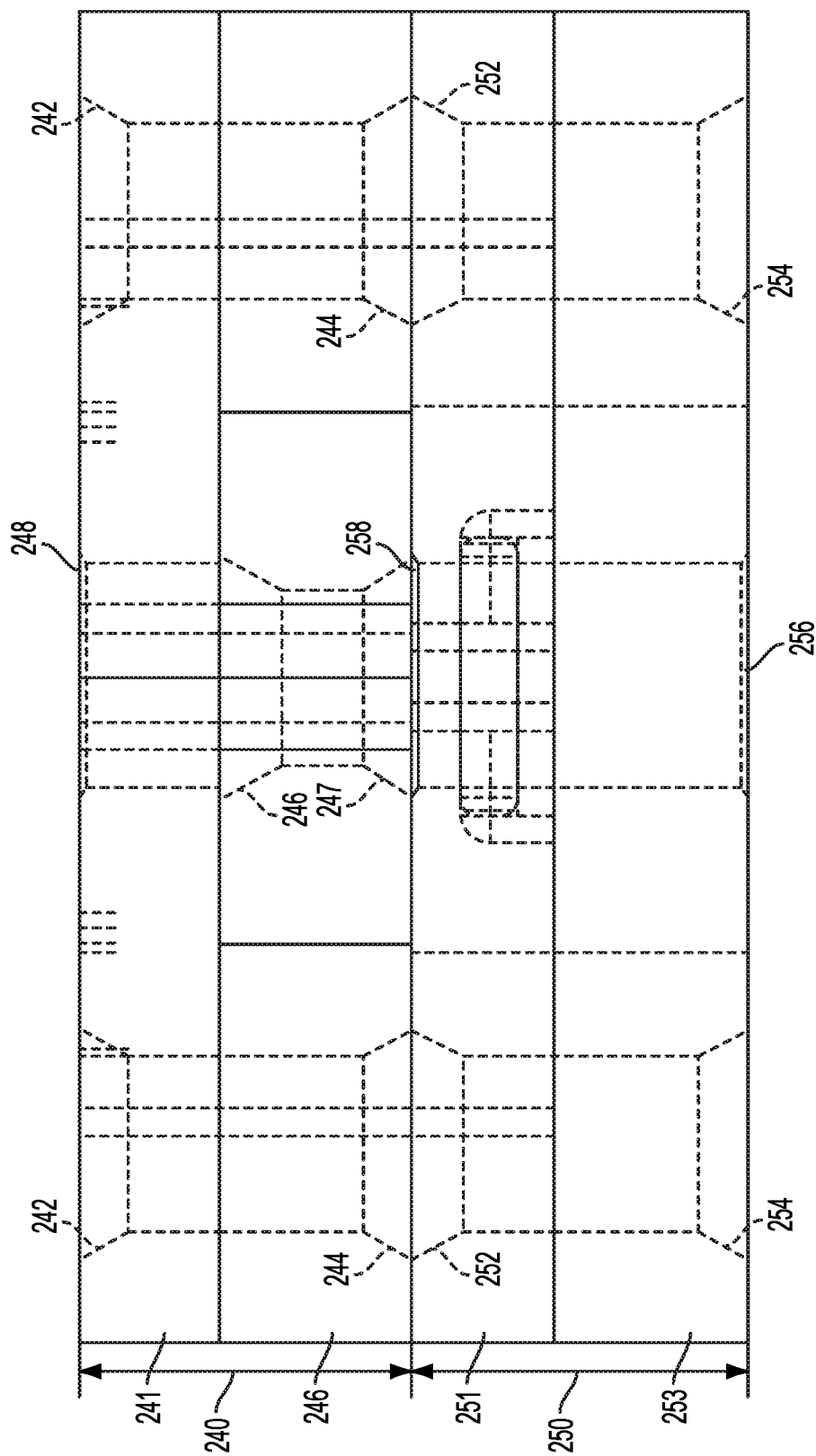
FIG. 7 is a blow-up cross-sectional view of the upper retaining plate and the lower retaining plate according to one or more embodiments shown and described herein.

As shown in the embodiments of FIGS. 1A-1B and 4A-5B, the collapsible core assembly 2 may include long actuation pins 80, which when disposed in the mold press 10 as in FIG. 1A, extend through both the upper retaining plate 240 and the lower retaining plate 250. As shown in FIGS. 5A and 7, the long actuation pins 80 may include collapsible coupling members 82 having a lip 83 which contacts the tapered opening 54 of the bottom surface of lower retaining plate 50. In contrast as shown in FIG. 4A, the short actuation pins 60 do not extend through both the upper retaining plate 240 and the lower retaining plate 250. The short actuation pins 60 may extend through the upper retaining plate 240 and only extend partially within the lower retaining plate 250. As shown in FIGS. 5A and 7, the short actuation pins 60 may also include collapsible coupling members 62 having a lip 63 which contacts the tapered opening 247 of the bottom surface of upper retaining plate 240. As will be shown below, actuation of the long actuator pins 80 may facilitate the movement of both the upper retaining plate 240 and the lower retaining plate 250 in tandem as shown in the progression from FIG. 6A to 6B, because the long actuator pins 80 extend through both the upper retaining plate 240 and the lower retaining plate 250.

Referring collectively to FIGS. 9-12 and 14, the static core member 20 may alternatively be coaxially surrounded by an unscrewing core 40 configured to form an internal feature 52. The unscrewing core 40 may comprise a ring shape coaxial to the static core member 20, an external threading mold 45, and an external pinion portion 42. As shown in the illustrative FIG. 13, the internal features 52 may be formed on one end of the molded part 5. However, the internal features 52 may be formed anywhere within the part 5, including the entire length. The external pinion portion 42 may comprise an internal surface that may be the surface surrounding the unscrewing core 40. In some embodiments, the unscrewing core 40 may comprise a threaded head 41 on a second end. The threaded head 41 may be configured to engage with a stationary nut 39. The stationary nut 39 may be imbedded in one of the plurality of retaining plates 140.

Figure 9:
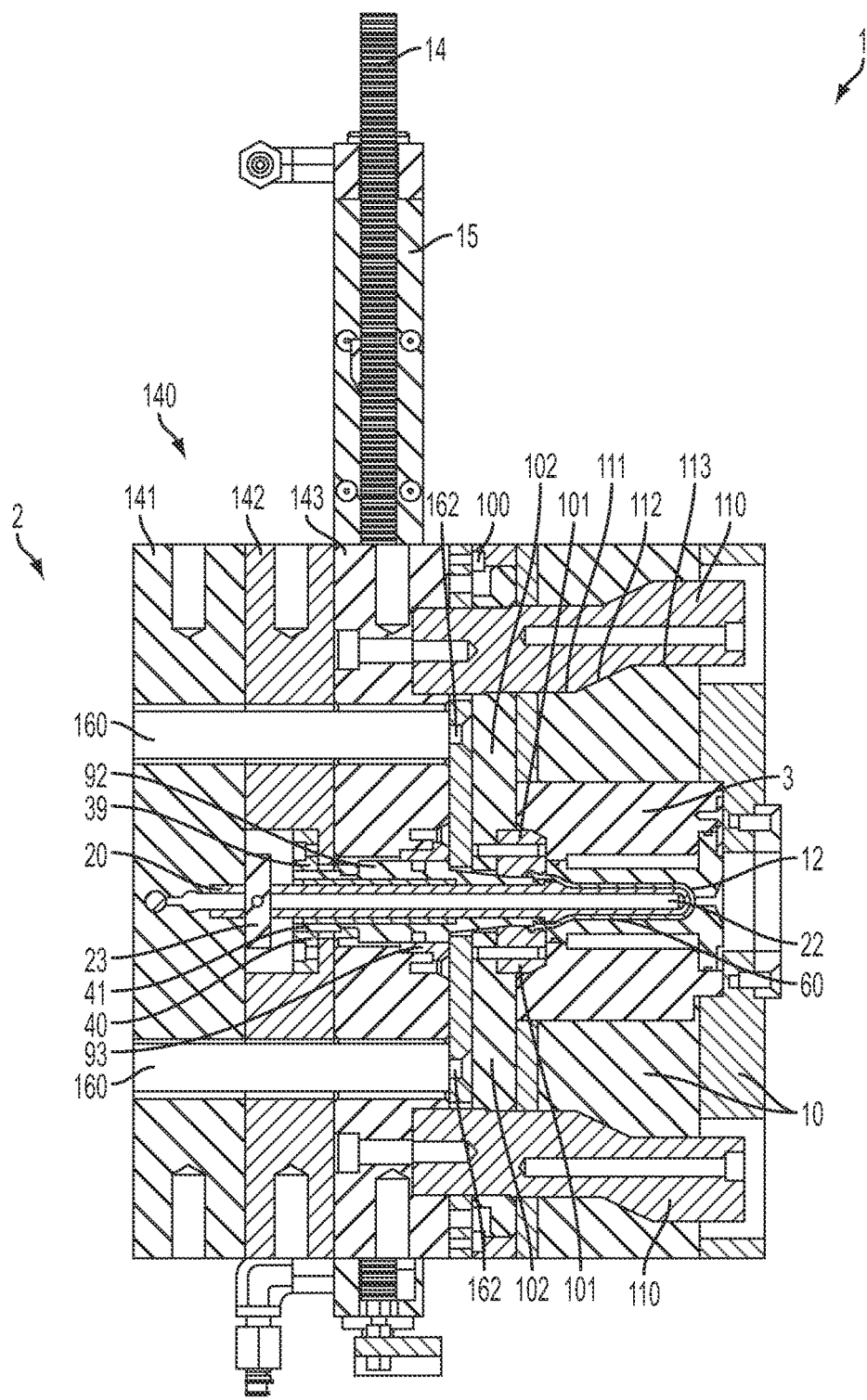
FIG. 9 is a schematic view from a side elevation of the injection molding assembly in a closed configuration according to one or more embodiments shown and described herein.
Figure 10:
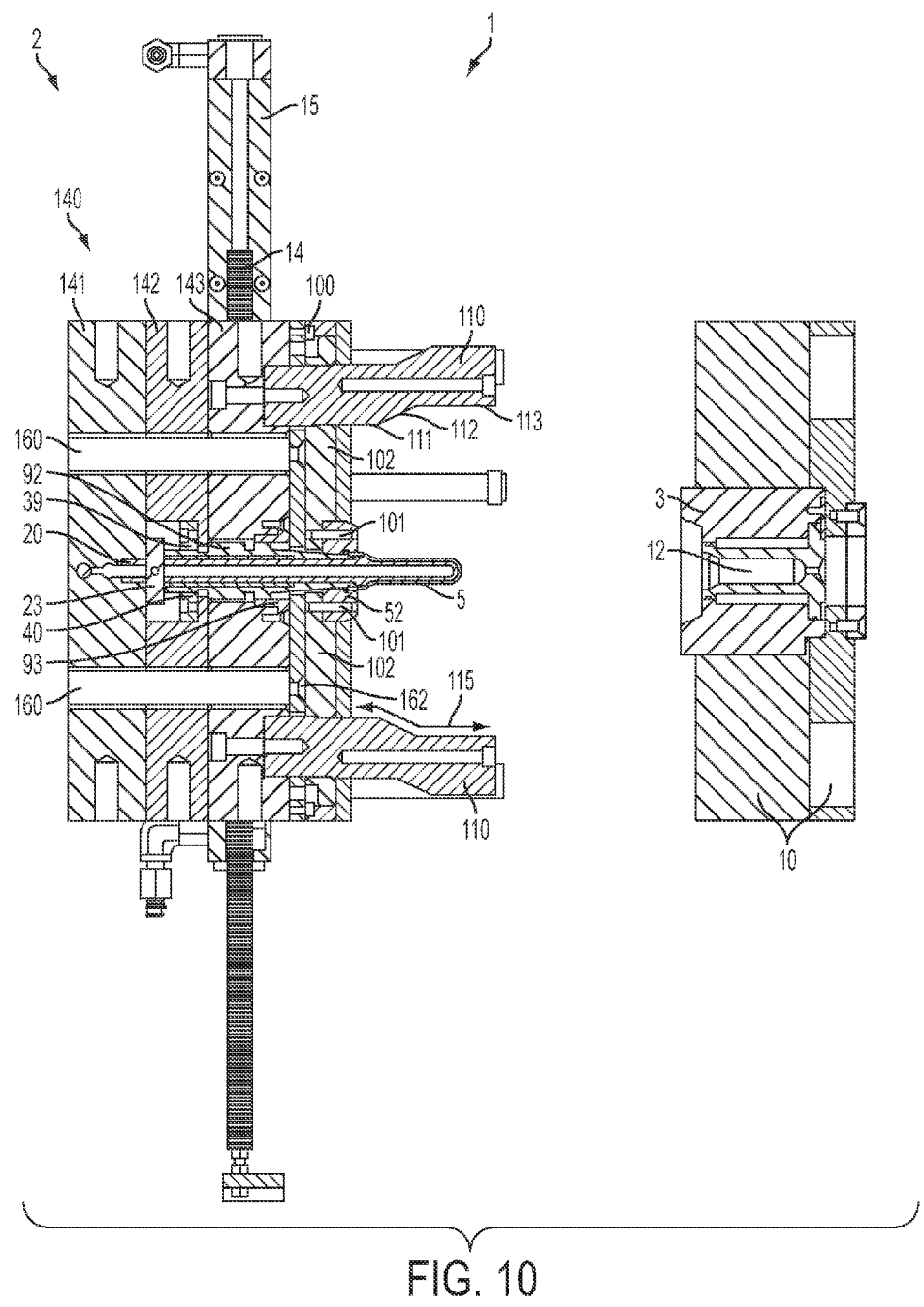
FIG. 10 is a schematic view from a side elevation of the injection molding assembly in an open configuration according to one or more embodiments shown and described herein.

The injection molding assembly 1 of may comprise a gear rack 14 and a hydraulic actuator 15 configured to rotate the unscrewing core 40. Referring to FIG. 9, the gear rack 14 may be disposed within and/or connected to a hydraulic cylinder 15. The hydraulic cylinder 15 generally actuates the gear rack 14. The hydraulic cylinder 15 may be incorporated within one of the retaining plates 140. In some embodiments, the hydraulic cylinder 15 may be embedded in the third retaining plate 143 and offset from and/or traverse to the longitudinal axis of the core member 20. The hydraulic cylinder 15 may actuate the gear rack 14 across the retaining plates 140. The hydraulic cylinder 15 may additionally return the gear rack 14 to an original position. Additionally or alternatively, the unscrewing core 40 may be actuated by a helical screw or coil, hydraulic piston, electro servo motors, or the like.

Referring again to FIGS. 9-12, the collapsible core assembly 2 may comprise knock out rods 160, which may be engaged and moved by ejectors (not shown) of the injection molding assembly 1. The knock out rods 160 may be cylindrical and pass through the plurality of retainer plates 140. As described below, moving these knock out rods 160 causes movement in the stripper plate 100, the slides 101, and/or the slide retainers 102.

The knock out rods 160 may extend through the three retainer plates 141, 142, and 143 when disposed in the collapsible core assembly 2 as in FIG. 9. The knock out rods 160 may include a coupling member 162 which may contact the stripper plate 100. As will be shown below, actuation of the knock out rods 160 may facilitate the movement of the stripper plate 100, the slide retainers 102, and/or the slides 101 as shown in the progression from FIG. 10 to FIG. 11, through the knock out rods 160 extending through and past the first retainer plate 141. This actuation may likewise be shown to facilitate the movement of the stripper plate 100, the slide retainers 102, and/or the slides 101 in the progression from FIG. 11 to FIG. 12, where the knock out rods 160 extend through and past the first and second retainer plates 141, 142.

Figure 11:
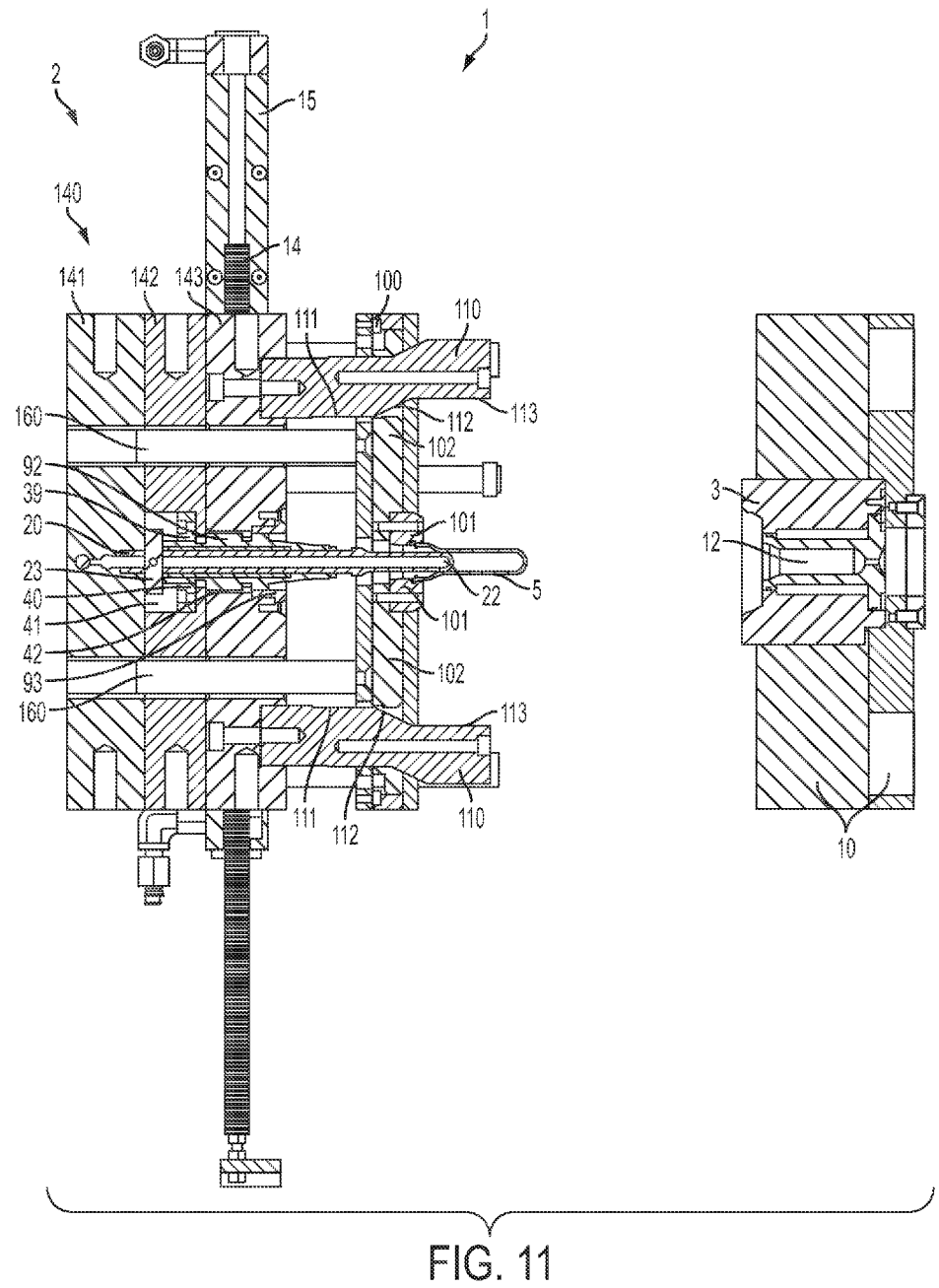
FIG. 11 is a schematic view from a side elevation of the injection molding assembly in an open configuration according to one or more embodiments shown and described herein.
Figure 12:
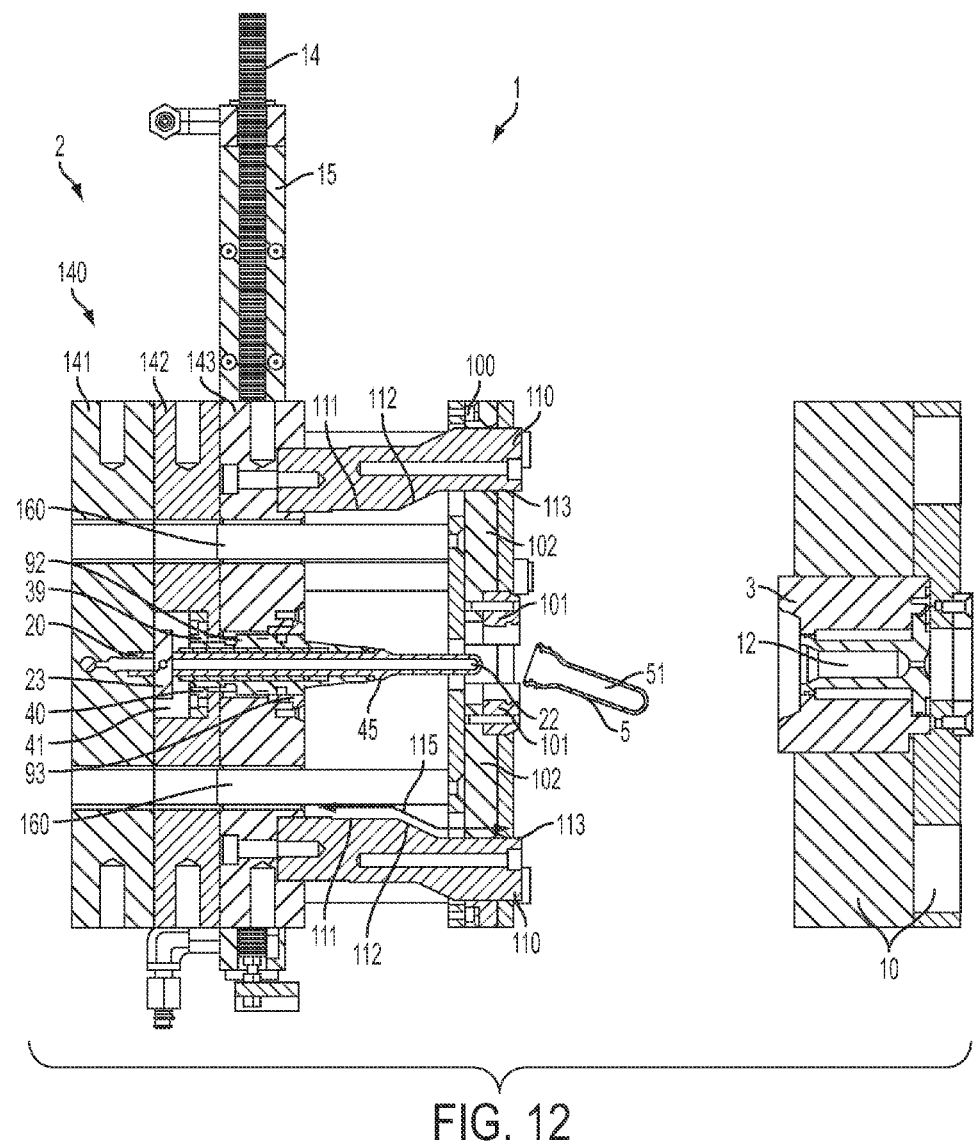
FIG. 12 is a schematic view from a side elevation of the injection molding assembly in an open configuration according to one or more embodiments shown and described herein.

The injection molding assembly 1 may further comprise actuation rods and actuation cams 110 disposed within the collapsible core assembly. The actuation cams 110 may be dog-legged. The dog leg cams 110 may provide a travel path 115 for the slide retainers 102 when the preform core assembly 2 moves from a closed position (FIG. 9) to an extended position (FIGS. 11 and 12). In some embodiments, the dog leg cam 110 may have a first linear surface 111, a cam surface 112, and a second linear surface 113. The first linear surface 111, the cam surface 112, and the second linear surface 113 may form the travel path 115 along all or a portion of the combined distance of the three surfaces 111, 112, 113 along the dog leg cam 110. In some embodiments, the dog leg cams 110 may have the first linear surfaces 111 fastened to the third retaining plate 143. While various fasteners are contemplated herein, a screw fastener 90 may be utilized in the present embodiments. The dog leg cam 110 may be fastened to the third retaining plate to be configured to have the first linear surface 111 closer to the core member 20 than the second linear surface 113.

The injection molding assembly 1 may further comprise a friction reducing component 92, such as a rulon bushing, about the static core member 20. Additionally or alternatively, the injection molding assembly 1 may comprise a friction reducing component 93, such as a bronze or rulon bushing, about the unscrewing core 40.

As shown in FIG. 2, the injection molding assembly 1 may further comprise moveable upper retaining plates 240 and moveable lower retaining plates 250. As shown in FIGS. 2 and 7, the upper retaining plate 240 and/or lower retaining plate 250 may include one or multiple individual rings attached together to form the plates 240 and 250. As shown in the embodiment of FIGS. 2 and 7, the upper retaining plate 240 may include a top ring 241 fastened or attached to a bottom ring 243. Similarly, the lower retaining plate 250 may include a top ring 251 fastened or attached to a bottom ring 253. While various fasteners are contemplated herein, a screw fastener 90 may be utilized in the present embodiments.

In another embodiment shown in FIG. 9, the injection molding assembly 1 may comprise a plurality stationary retaining plates 140. In some of these embodiments, there may be three stationary retaining plates 140, with a first retaining plate 141, a second retaining plate 142, and a third retaining plate 143. The retaining plates 140 may be fastened together. While various fasteners are contemplated herein, a screw fastener 90 may be utilized in the present embodiments.

Figure 13:
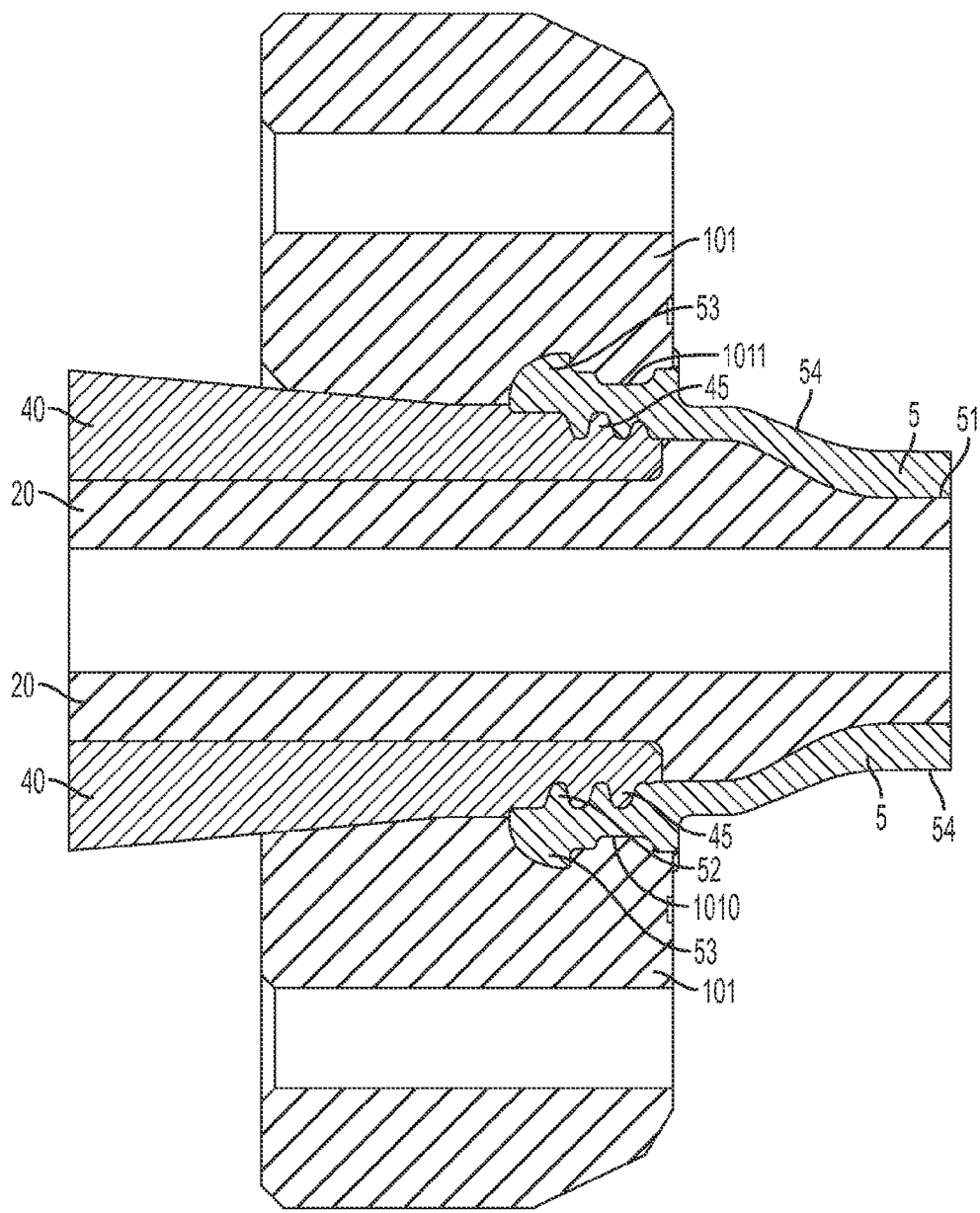
FIG. 13 is a blow-up cross-sectional view of the engagement of the slides, the molded part, the core member, and the unscrewing core according to one or more embodiments shown and described herein.
Figure 14:
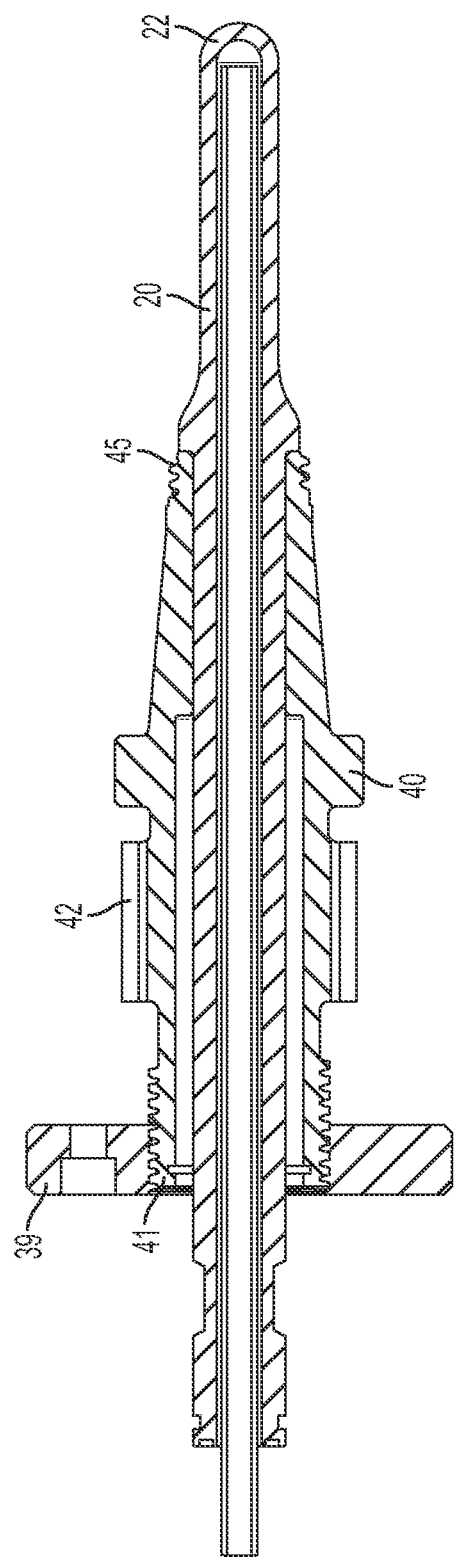
FIG. 14 is a schematic cross-sectional view from a side elevation of the core member, the unscrewing core, and the threaded nut in isolation according to one or more embodiments shown and described herein.

The internal feature 52 of the molded part 5 may comprise threading, a lip, a recess, or a combination thereof. Additionally or alternatively, the molded part 5 may comprise an external feature 53 that may be threading, a lip, a recess, or a combination thereof. Referring to FIG. 13, the molded part 5 may comprise an internal feature 52 on an internal surface 51. In embodiments with an unscrewing core 40, the internal feature 52 may be molded by an external feature surface 45 of the unscrewing core 40. In embodiments with extendable member 72, 74, the internal feature 52 may be molded undercut engagement sections 75 and 77. The internal feature 52 may be a lip, abutment, threading, etching, or the like. In some embodiments, the molded part 5 may comprise an external feature 53 on an external surface 54. The external feature 53 may be molded by the internal feature surface 1011 of the slides 101. The external feature 53 may be a lip, abutment, threading, etching, or the like. The molded part 5 may be any of shape wherein there may be an internal part or feature. An illustrative embodiment of the molded part 5 may be a hollow preform operable for use in blow molding plastic bottles, wherein the preform includes an internal feature (e.g., threading) at or around a neck portion disposed in or along an internal surface 51 within the body of the mold part 5.

In operation, the steps of the injection molding process 500 for producing a molded part with an internal feature may comprise inserting the collapsible core assembly 2 into the internal cavity 12 of the injection mold press 10 to form a closed mold; an injection step 520 comprising injecting resin in the spacing between the collapsible core assembly 2 and the internal cavity 12 to form the molded part 5, wherein the internal feature 52 of the molded part 5 is formed over the external engagement feature of the moveable core assembly and mating engages the external engagement feature; an unthreading step 530 comprising disengaging the movable core member from mated engagement with the molded part 5; and ejecting the disengaged molded part 5 with the stripper plate 100.

Figure 15:
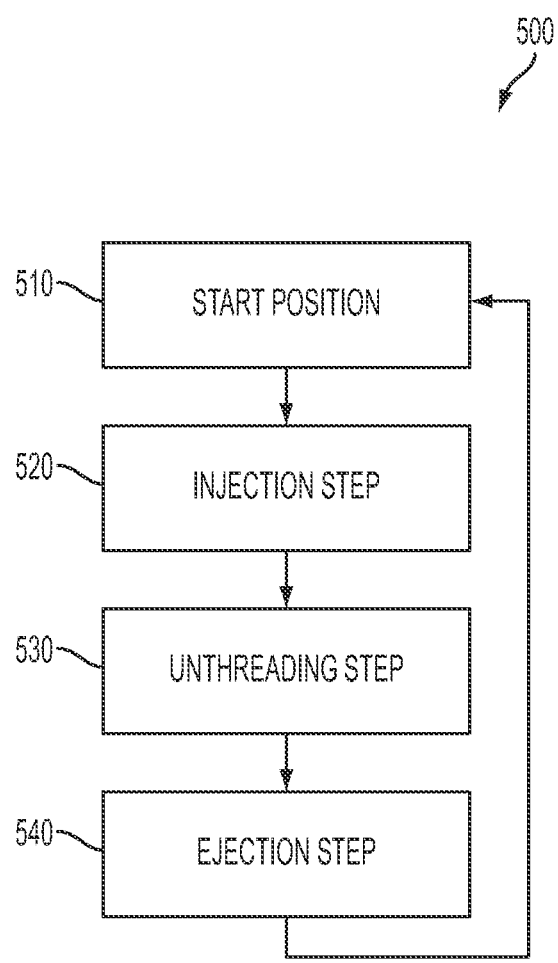
FIG. 15 is a flowchart of the injection molding process according to one or more embodiments shown and described herein.

Referring to FIG. 15, some embodiments of the injection molding process may commence with a start position 510. The collapsible core assembly 2 and the cavity assembly 3 may be brought together to form a closed mold configuration of the injection molding assembly 1 (FIG. 9) for a start position 510 of an injection molding process 500 for embodiments with an unscrewing core 40. In this configuration, a molded part cavity 60 is defined as the space between the combined internal surfaces of the cavity 12 and the slides 101 and the combined external surfaces of the unscrewing core 40 and the core member 20. In some embodiments, the external surface of the unscrewing core 40 may comprise an external feature surface 45. The external feature surface 45 may create a mold for forming an internal feature 52 such threading, etching, or the like within a molded part 5 such as, for example, within a hollow preform.

Once the injection molding assembly 1 has been closed, the injection molding process 500 may continue to an injection step 520. A fluidized plastic may be injected by the injector of the injection molding assembly 1 through the cavity assembly 3 into the molded part cavity 60. The fluidized plastic then may partially or completely solidify in the molded part cavity 60 to form the molded part 5. Alternatively or additionally, in this step or additional steps, other fluidized materials may be injected by the injector of the injection molding assembly 1 into the molded part cavity 60. In some embodiments, the entirety of the molded part cavity 60 may be filled by the fluidized plastic.

The injection molding process 500 may continue to an unthreading step 530 wherein the unscrewing core 40 may be disengaged from the internal feature 52 of the molded part 5 and may recede into the collapsible core assembly 2.

The collapsible core assembly 2 may hold the molded part 5 inside the mold cavity 12 of the mold press 10 as depicted in FIG. 9. The cavity assembly 3 may then be disengaged from the collapsible core assembly 2. In some embodiments, the hydraulic cylinder 15 actuates the gear rack 14 past the unscrewing core 40. The unscrewing core 40 interlocks with the gear rack 14 via the external pinion portion 42. The actuation of the gear rack 14 forces the interlocked unscrewing core 40 to rotate and follow the thread of the stationary nut 39. The unscrewing core 40 is then rotated to unscrew out of the formed internal feature 52 of the molded part 5. In this way, the step of disengaging the movable core member from mated engagement with the molded part 5 may further comprise rotating the unscrewing core 40 until the molded part 5 and the unscrewing core 40 are disengaged.

Once the unscrewing core 40 has been disengaged from the internal feature 52 of the molded part 5, the injection molding process 500 may continue to an ejection step 540. The knock out rods 160 may extend out of the retainer plates 140 to press the stripper plate 100 away from the static core member 20. The stripper plate 100 may engage with the slides 101 and the slide retainers 102. When the knock out rods 160 moves the stripper plate 100, the slide retainers 102 may be forced to follow the travel path 115 of the dog leg cams 110. The slides 101 may likewise follow the slide retainers 102 outward along the travel path 115 set by the dog leg cams 110. The movement of the slide retainers 102 along the dog leg cams 110 may separate the slides 101 from one another to release the molded part 5. The molded part 5 may then be dropped in a free fall manner from the preform core assembly 2 (FIG. 12). The hydraulic cylinder 15 may then return to its starting position (FIG. 9). As the hydraulic cylinder 15 returns to its starting position, it may screw the unscrewing core 40 into position for another cycle. The injection molding process 500 may then repeat.

In embodiments with extendable members 72, 74, the injection molding process 500 similarly begins with a starting position 510 wherein the collapsible core assembly 2 and the cavity assembly 3 are closed. The injection step 520 is likewise similar. For embodiments with extendable members 72, 74, disengaging the movable core member from mated engagement with the molded part 5 may further comprise collapsing the extendable members 72, 74 to detach the molded part 5 from the movable member.

Figure 1B:
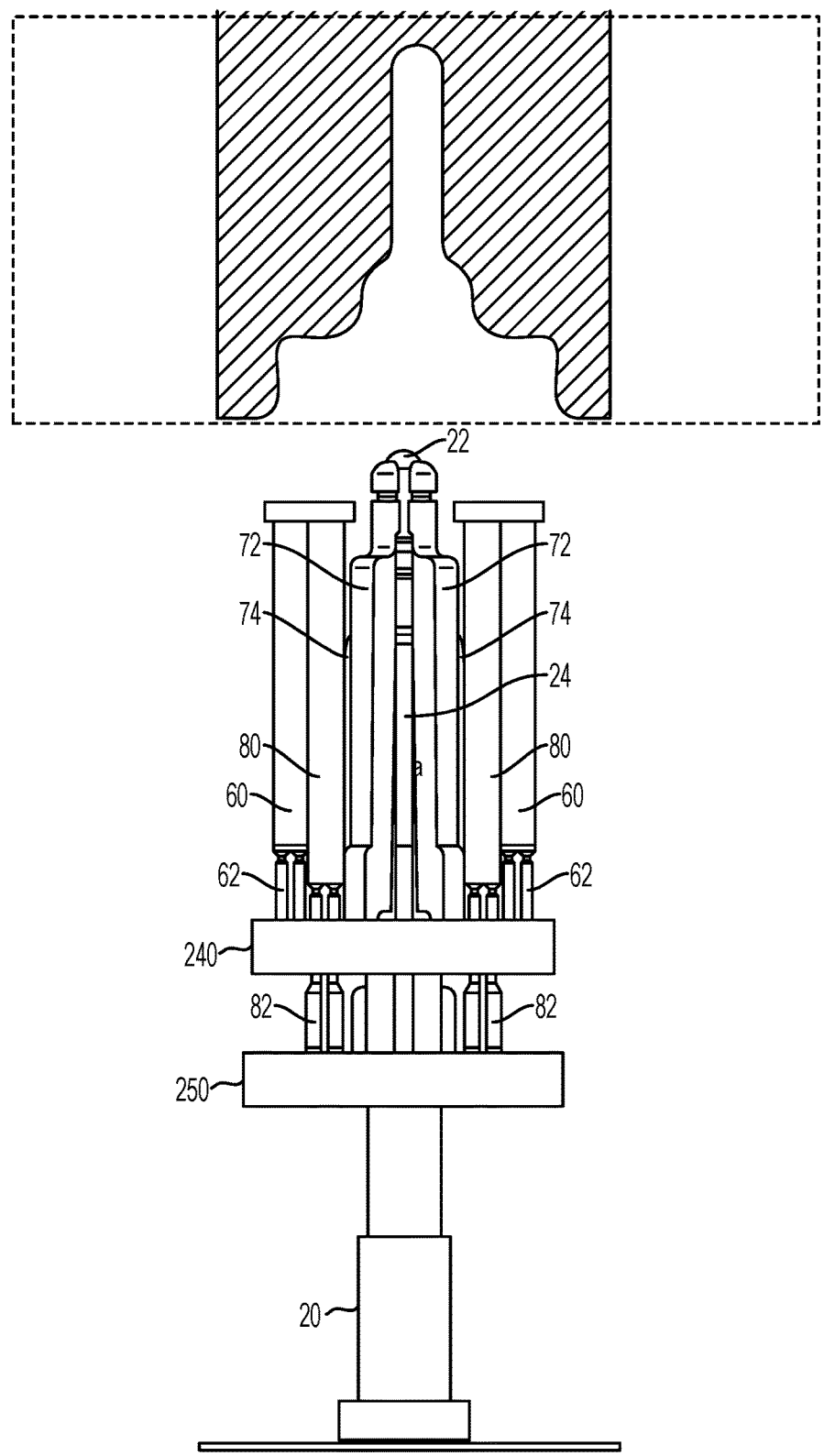
FIG. 1B a schematic view from a side elevation of the injection molding assembly of FIG. 1A in an open configuration.

When the injection molding process in completed and it is desirable to commence with the unthreading step 530 depicted in FIG. 1B, wherein the molded part 5 is removed from the collapsible preform core assembly 2, The actuation pins 60, 80, which may be oriented in a moving plate (not shown), may be engaged by a stripper plate (not shown), which moves after the mold press 10 has been opened. In one embodiment, when the stripper plate moves forward, the actuating pins 60, 80 are also moved forward. While not shown, ejectors on the mold press 10 move the stripper plate away from the static core member 20.

As shown in FIG. 6A, the maximum degree of motion for this embodiment is depicted. Here, the degree of motion is dictated by the static control ring 30 and the core stop surface 25 (See FIG. 6B) of the static core member 20. Referring to FIG. 6B, the stripper plate 100 may pull actuation pins 60 and 80, thereby moving the upper retaining plate 240 and the lower retaining plate 250 in tandem (See 1st move).

Figure 8B:
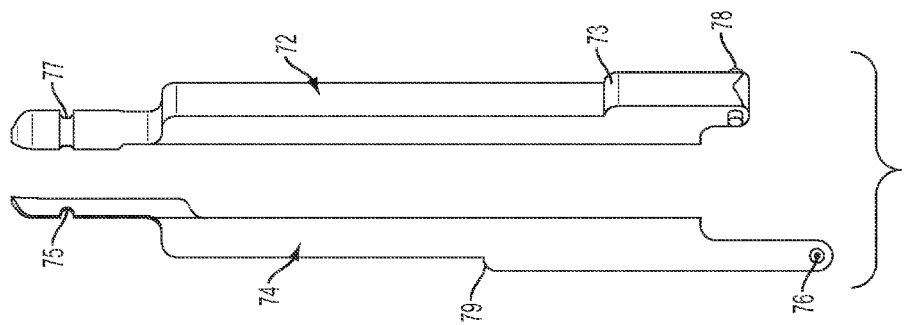
FIG. 8B is a side view of the two extendable members of FIG. 8A.

After moving the upper retaining plate 240 and the lower retaining plate 250, the lip member 79 of the shorter movement collapsible finger 74 may contact the recessed portion 32 of the static control ring 30, thereby forcing the shorter movement collapsible finger 74 to move inward by pivoting on the hinge pin 76. This inward movement thereby detaches the undercut engagement portion 75 from the internal feature 52 of the molded part 5. As shown in the progression from FIG. 8A to 8B and further depicted in FIG. 3B, the engagement of the recessed portion 32 of the static control ring 30 results in a configuration wherein the shorter movement collapsible finger 74 is oriented below the longer movement collapsible finger 72, because the longer movement collapsible finger 72 has not yet been detached from the internal feature 52 of the molded part 5.

Figure 6C:
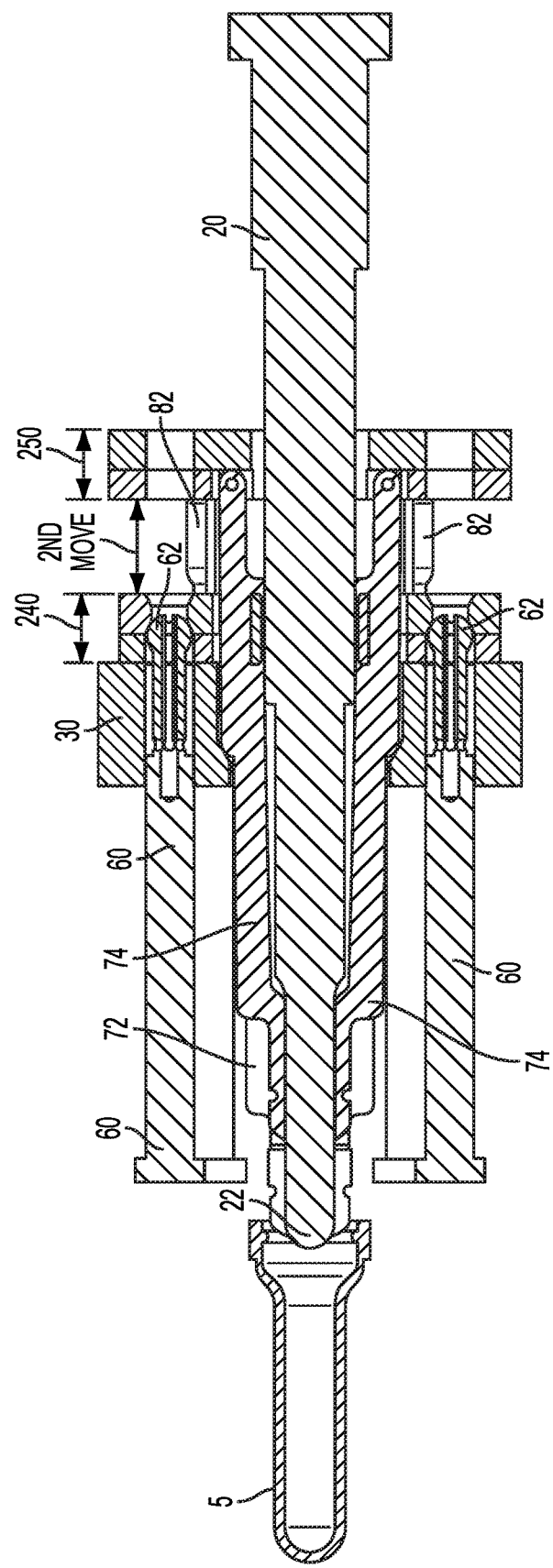
FIG. 6C is a schematic view from a side elevation of the collapsible core assembly in a unthreading configuration according to one or more embodiments shown and described herein.

Subsequently, as shown in FIGS. 6B and 6C, the lower retainer plate 240 may no longer move during the unthreading step 530, and the actuation pins 60, 80 may collapse and pass through the lower retainer plate 240. As the lower retainer plate 250 may no longer move, the shorter movement collapsible finger 74 which is attached to the lower retainer plate 250 may also no longer move during the unthreading step 530.

Referring to FIG. 6C, the upper retainer plate 240 may continue to move with the actuation pins 60, 80 driven by the stripper plate (See 2nd move). With this movement, the lip 73 of the longer movement collapsible fingers 72 may contact the recessed portion 32 of the static control ring 30, thereby forcing the longer movement collapsible fingers 72 to move inward by pivoting on hinge pin 76. This inward movement detaches the undercut engagement portion 77 from the internal feature 52 of the mold part 5. The actuating pins 60, 80 then collapse allowing them to pass though the upper retainer plate 240.

In the ejection step 540, the stripper plate 100 may continue moving until the molded part 5 falls off the top end 22 of the static core member 20. When the stripper plate 100 is retracted, the actuator pins 60 and 80 have expanded enough to push the upper retainer plate 240 and lower retainer plate 250 back to the molding position. When they reach this position, the actuator pins 60 and 80 may collapse and pass through the upper retainer plate 240 and lower retainer plate 250, and expand to move the upper retainer plate 240 and lower retainer plate 250 into a start position 510 for another injection molding process 500 cycle.

The table below provides a listing of parts in one example of the molding assembly.

| Part Number | Part Description |
|---|---|
| 1 | injection molding system |
| 2 | collapsible core assembly |
| 5 | molded part |
| 10 | mold press |
| 12 | mold press cavity |
| 20 | core member |
| 22 | core top |
| 25 | core stop surface |
| 30 | static control ring |
| 32 | recessed portion of static control ring |
| 39 | stationary nut |
| 40 | unscrewing core |
| 41 | threaded head |
| 42 | external pinion portion |
| 45 | external feature (of unscrewing core 40) |
| 51 | internal surface (of molded part 5) |
| 52 | internal feature (of molded part 5) |
| 53 | external feature (of molded part 5) |
| 54 | external surface (of molded part 5) |
| 60 | long actuation pin |
| 62 | collapsible coupling member of long actuation pin |
| 72 | Longer movement collapsible finger coaxially surrounding the core |
| 74 | Shorter movement collapsible finger coaxially surrounding the core |
| 75 | Undercut engagement section of shorter movement collapsible finger |
| 76 | Hinge pin for shorter movement collapsible finger |
| 77 | Undercut engagement section of longer movement collapsible finger |
| 78 | hinge pin for longer movement collapsible finger |
| 79 | lip member of shorter movement collapsible finger |
| 80 | short actuation pin |
| 82 | collapsible coupling member of long actuation pin |
| 83 | upper lip of collapsible coupling member of long actuation pin |
| 90 | screw fastener |
| 92 | rulon bushing |
| 93 | bronze bushing |
| 100 | stripper plate |
| 101 | slide |
| 102 | slide retainer |
| 110 | dog leg cam |
| 111 | first linear surface |
| 112 | cam surface |
| 113 | second linear surface |
| 115 | travel path |
| 140 | retraining plates |
| 141 | first retaining plate |
| 142 | second retaining plate |
| 143 | third retaining plate |
| 160 | knock out rods |
| 162 | coupling member |
| 240 | moveable upper retaining plate |
| 241 | top ring of upper retaining plate |
| 242 | tapered opening on top surface of upper retaining plate for engagement with long actuation pin |
| 243 | bottom ring of upper retaining plate |
| 244 | tapered opening on bottom surface of upper retaining plate for engagement with long actuation pin |
| 246 | tapered opening on upper surface of bottom ring of upper retaining plate for engagement with short actuation pin |
| 247 | tapered opening on bottom surface of upper retaining plate for engagement with short actuation pin |
| 248 | opening on upper surface of upper retaining plate for engagement with short actuation pin |
| 250 | moveable lower retaining plate |
| 252 | tapered opening on upper surface of lower retaining plate for engagement with long actuation pin |
| 254 | tapered opening on lower surface of bottom ring of lower retaining plate for engagement with long actuation pin |
| 256 | opening on bottom surface of lower retaining plate for engagement with short actuation pin |

Having provided reference to specific embodiments, it will be apparent that modifications and variations are possible without departing from the scope of the present disclosure defined in the appended claims. More specifically, although some aspects of the present disclosure are identified herein as preferred or particularly advantageous, it is contemplated that the present disclosure is not necessarily limited to these preferred aspects of any specific embodiment.

What is claimed is:

1. A collapsible core assembly comprising:
a first retainer plate;
a second retainer plate wherein the first and second retainer plates are simultaneously and independently movable;
a static core member disposed through the first retainer plate and second retainer plate;
a plurality of first extendable members, wherein each one of the plurality of first extendable members is coaxially disposed about the static core member, is pivotally connected to and movable with the first retainer plate and comprises an external engagement feature disposed at a distal end of each first extendable member that is constructed to matingly engage an internal feature of a molded part;

a plurality of second extendable members, wherein each one of the plurality of second extendable members is coaxially disposed about the static core member, is pivotally connected to and movable with the second retainer plate and comprises an external engagement feature disposed at a distal end of each second extendable member that is constructed to matingly engage an internal feature of the molded part.

2. The injection molding assembly of claim 1, wherein the first extendable members and the second extendable members define a ring shape coaxial to the static core member.

3. The injection molding assembly of claim 1, further comprising a friction reducing component disposed about the static core member.

4. The injection molding assembly of claim 1, wherein the internal feature of the molded part comprises threading, a lip, a recess, or a combination thereof.

5. The collapsible core assembly of claim 1, wherein each one of the plurality of second extendable members are disposed about the static core member between two adjacent first extendable members of the plurality of first extendable members.

6. The collapsible core assembly of claim 1, wherein the static core member comprises a cylindrical rod.

7. The collapsible core assembly of claim 1, wherein each one of the plurality of first extendible members is a shorter movement collapsible finger and each one of the plurality of second extendible members is a longer movement collapsible finger.

* * * * *